US011163036B2

(12) United States Patent
Billaud

(10) Patent No.: US 11,163,036 B2
(45) Date of Patent: Nov. 2, 2021

(54) METHOD FOR DETECTING AND LOCATING FALSE ADS-B TARGETS AND SECONDARY RADAR SYSTEM IMPLEMENTING SUCH A METHOD

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 260 days.

(21) Appl. No.: 16/447,832

(22) Filed: Jun. 20, 2019

(65) Prior Publication Data

US 2019/0391228 A1 Dec. 26, 2019

(30) Foreign Application Priority Data

Jun. 25, 2018 (FR) ...................................... 1800657

(51) Int. Cl.
*G01S 7/02* (2006.01)

(52) U.S. Cl.
CPC ................... *G01S 7/021* (2013.01)

(58) Field of Classification Search
CPC ........ G01S 13/933; G01S 13/86; G01S 13/87; G01S 17/933; G01S 13/42; G01S 13/91;
(Continued)

(56) References Cited

U.S. PATENT DOCUMENTS

| 8,498,803 B2 * | 7/2013 | Blomenhofer | ....... | G08G 5/0052 701/120 |
| 8,666,650 B2 * | 3/2014 | Mutuel | ................ | G08G 5/0008 701/300 |

(Continued)

FOREIGN PATENT DOCUMENTS

| EP | 2 960 671 A1 | 12/2015 |
| EP | 3 088 911 A1 | 11/2016 |

OTHER PUBLICATIONS

Mariano, et al., "Data integrity augmentation by ADS-B SSR hybrid techniques", 2018 Integrated Communications, Navigation, Surveillance Conference (ICNS), Apr. 10, 2018.
(Continued)

*Primary Examiner* — James M Perez
(74) *Attorney, Agent, or Firm* — BakerHostetler

(57) ABSTRACT

An ADS-B spoofer being an false ADS-B squitter, an ADS-B squitter being an aircraft position information signal transmitted to secondary radars, the ADS-B squitters being detected over time at different bearings of the antenna in rotation of the radar, the method comprises, for each secondary radar, at least the following steps: a first step of detection of an ADS-B spoofer; a second step of location of the position in azimuth of the ADS-B spoofer generator, the second step comprising the following operations: measurement of the azimuth of the antenna of the secondary radar and of the received powers on the sum, difference and control patterns of the antenna upon the detection of an ADS-B squitter; generation and storage of at least one assumption of azimuth of the spoofer for each ADS-B squitter detected, the assumption being equal to the sum of the azimuth of the antenna and of the estimated bearing of the spoofer, the estimated bearing being characterized by the ratio of the received power on the sum pattern to the received power on the control pattern on the one hand and by the ratio of the received power on the difference pattern to the received power on the control pattern on the other hand.

14 Claims, 11 Drawing Sheets

(58) Field of Classification Search
CPC ............ G01S 7/003; G01S 2013/0254; G01S 13/762; G01S 13/88; G01S 13/426; G01S 13/4463; G01S 13/865; G01S 19/13; G01S 7/00; G01S 7/021
See application file for complete search history.

(56) References Cited

U.S. PATENT DOCUMENTS

| | | | |
|---|---|---|---|
| 9,918,192 B2* | 3/2018 | Rodriguez Montejano | H04W 72/0446 |
| 10,795,016 B2* | 10/2020 | Hauswald | G08G 5/0008 |
| 11,022,696 B1* | 6/2021 | Kacem | G06F 11/1004 |
| 11,086,006 B2* | 8/2021 | Billaud | G01S 13/762 |
| 2006/0119515 A1* | 6/2006 | E. Smith | G08G 5/0082 342/450 |
| 2007/0159378 A1* | 7/2007 | Powers | G01S 7/003 342/29 |
| 2007/0252750 A1* | 11/2007 | Jean | G01S 13/784 342/40 |
| 2008/0266166 A1* | 10/2008 | Schuchman | G07C 5/008 342/37 |
| 2009/0322586 A1* | 12/2009 | Lanzkron | G01S 3/46 342/36 |
| 2011/0015852 A1* | 1/2011 | Blomenhofer | G08G 5/0052 701/120 |
| 2011/0057830 A1* | 3/2011 | Sampigethaya | G01S 5/0289 342/36 |
| 2011/0215960 A1* | 9/2011 | Stevens | G01S 7/36 342/37 |
| 2011/0215963 A1* | 9/2011 | Perl | G01S 7/40 342/156 |
| 2012/0041620 A1* | 2/2012 | Stayton | G08G 5/0008 701/3 |
| 2012/0072101 A1* | 3/2012 | Mutuel | G08G 5/0008 701/300 |
| 2014/0327564 A1* | 11/2014 | Sampigethaya | G08G 5/0013 342/32 |
| 2014/0327581 A1* | 11/2014 | Murphy | G01S 19/215 342/417 |
| 2015/0331099 A1* | 11/2015 | Wu | G08G 5/0008 342/32 |
| 2016/0309291 A1* | 10/2016 | Rodriguez Montejano | H04L 43/16 |
| 2018/0172797 A1* | 6/2018 | Hauswald | G08G 5/0078 |
| 2018/0196140 A1* | 7/2018 | Garcia | G01S 5/12 |
| 2018/0288627 A1* | 10/2018 | Ellum | H04W 16/28 |
| 2019/0019420 A1* | 1/2019 | X | G08G 5/0026 |
| 2019/0187271 A1* | 6/2019 | Billaud | G01S 7/41 |
| 2019/0391228 A1* | 12/2019 | Billaud | G01S 13/933 |
| 2020/0088887 A1* | 3/2020 | Garcia | G01S 13/91 |
| 2020/0150214 A1* | 5/2020 | Neufeldt | G01S 19/48 |
| 2020/0191910 A1* | 6/2020 | Billaud | G01R 29/10 |
| 2021/0156989 A1* | 5/2021 | Billaud | G01S 13/784 |

OTHER PUBLICATIONS

Mariano, et al., "Data integrity augmentation by ADS-B SSR hybrid techniques", 2018 Integrated Communications, Navigation, Surveillance Conference (ICNS), pp. 1-15, Apr. 10, 2018.

* cited by examiner

METHOD FOR DETECTING AND LOCATING FALSE ADS-B TARGETS AND SECONDARY RADAR SYSTEM IMPLEMENTING SUCH A METHOD

CROSS-REFERENCE TO RELATED APPLICATIONS

This application claims priority to foreign French patent application No. FR 1800657, filed on Jun. 25, 2018, the disclosure of which is incorporated by reference in its entirety.

FIELD OF THE INVENTION

The present invention relates to a method for the detection and location, by a secondary radar, of generators of false ADS-B information. It relates also to a system of secondary radars implementing such a method.

The field of the invention is air traffic control (ATC) for which the increasing of the rate of refresh of the position of the targets, among other things, is a means of bringing the aeroplanes closer together and thus increasing the rate of aeroplanes taking off and landing. Position information supplied by the aeroplanes is not triggered in response to radar interrogation signals but is transmitted automatically from transmission means of the aeroplanes. This unsolicited position information is called "squitters" and more particularly ADS-B_out squitter, from the expression "Automatic Dependent Surveillance-Broadcast".

BACKGROUND

The ADS-B_out "squitters" are transmitted over a period of the order of a second and therefore potentially allow for a rate of refresh of the positions of the targets better than two seconds, to be compared with the conventional period of a radar of the order of 4 to 6 seconds.

One main defect with the ADS-B_out information is not being protected by the design of the Mode S protocol, also employed by the Mode S radar, a protocol on which the ADS-B_out information relies. Consequently, it is easy and inexpensive to simulate false aircraft transmitting false squitters ("spoofer") based on low-end computing machines on the ground generating ADS-B_out messages as would a genuine aircraft.

Malicious organizations can thus seed real disorganization in the ATC, even going as far as provoking incidents or accidents between real aeroplanes.

Because of this fragility, in practice, the ADS-B_out is generally not used on its own operationally in air traffic control.

A solution for detecting ADS-B squitters using WAM (Wide Area Multilateration) has been proposed in the literature. The limitations associated with this solution are those of WAM. The cost per square metre covered is significant and the geographic coverage is limited. Finally, it causes electromagnetic pollution due to the use of antennas of small sizes and that are therefore unfocused.

SUMMARY OF THE INVENTION

One aim of the invention is in particular to overcome the abovementioned drawbacks. To this end, the subject of the invention is a method for the detection and location of ADS-B spoofer generators by a radar system comprising at least one secondary radar, an ADS-B spoofer being a false ADS-B squitter, an ADS-B squitter being an aircraft position information signal transmitted to receivers including the receivers of the radars of said system, said ADS-B squitters being detected over time at different bearings of the antenna, said method comprising, for each secondary radar, at least the following steps:
a first step of detection of an ADS-B spoofer;
a second step of location of the position in azimuth of said ADS-B spoofer generator, said second step comprising the following operations:
measurement of the azimuth of the antenna of the secondary radar and of the received powers on the sum, difference and control patterns of the antenna upon the detection of an ADS-B squitter;
generation and storage of at least one assumption of azimuth of said spoofer for each ADS-B squitter detected, said assumption being equal to the sum of the azimuth of said antenna and of an assumption of estimated bearing of said spoofer, said estimated bearing being characterized by the convergence between the pair of the ratios of the received power on the sum pattern to the received power on the control pattern on the one hand and by the ratio of the received power on the difference pattern to the received power on the control pattern on the other hand, and the same pairs for the different known possible bearings of the antenna.

Said second step also produces, for example, an accumulation of said assumptions over a given time period, the azimuth of said ADS-B spoofer being a function of said assumptions.

In a particular implementation, said radar system comprising at least two secondary radars, said method comprises a third step of location of said ADS-B spoofer generator in terms of distance, said third step crossing the azimuth angular segments of each secondary radar, the distance from said ADS-B spoofer generator to a radar being the distance from said intersection to said radar, an azimuth angular segment being an angular segment centred on the azimuth obtained in said second step.

The angular deviation of said intersection gives, for example, the accuracy of location in terms of azimuth of said ADS-B spoofer generator.

The generation of said assumptions of azimuth uses, for example, several deviation tolerances out of:
the accuracy of measurement of said power;
the number of assumptions accumulated;
the accuracy of the reading of the antenna patterns.

Said assumptions of ADS-B spoofer azimuth use, for example, in parallel, several accuracies in terms of azimuth of said antenna patterns, the azimuth being defined according to pitch intervals, the azimuth pitch interval for locating a spoofer generator in motion being greater than for locating a fixed generator.

In said second step, said assumptions are, for example, accumulated:
over a given time, to locate a fixed ADS-B spoofer generator;
over a shorter time, to locate an ADS-B spoofer generator in motion.

In said second step, said assumptions of said ADS-B spoofer at the level of a radar are, for example, worked out both in azimuth and in elevation by exploiting in parallel several assumptions based on several antenna patterns in azimuth according to different cuts in elevation.

In said third step, said system comprising at least three secondary radars, said ADS-B spoofer is, for example, located in terms of azimuth, distance and altitude by the intersection of solid angular segments of each secondary radar, a solid angular segment being a segment of solid angle centred on the azimuth and on the elevation obtained in said second step.

In said third step, the location of said ADS-B spoofer is for example performed as a function of:
- the quality of the location defined in said second step;
- the uncertainty on said location defined by each of said radars;
- the distance of said ADS-B spoofer with respect to each of said receivers.

Said first step is for example implemented by detection means external to said radar system.

Another subject of the invention is a secondary radar implementing at least the first two steps of the method as described previously.

Yet another subject of the invention is a secondary radar system, comprising at least two radars of the above type and processing means capable of communicating with said radars and capable of implementing said third step of the method as described previously. Said processing means are for example incorporated in one of said radars.

BRIEF DESCRIPTION OF THE DRAWINGS

Other features and advantages of the invention will become apparent from the following description given in light of attached drawings which represent.

DETAILED DESCRIPTION

Figure 1:
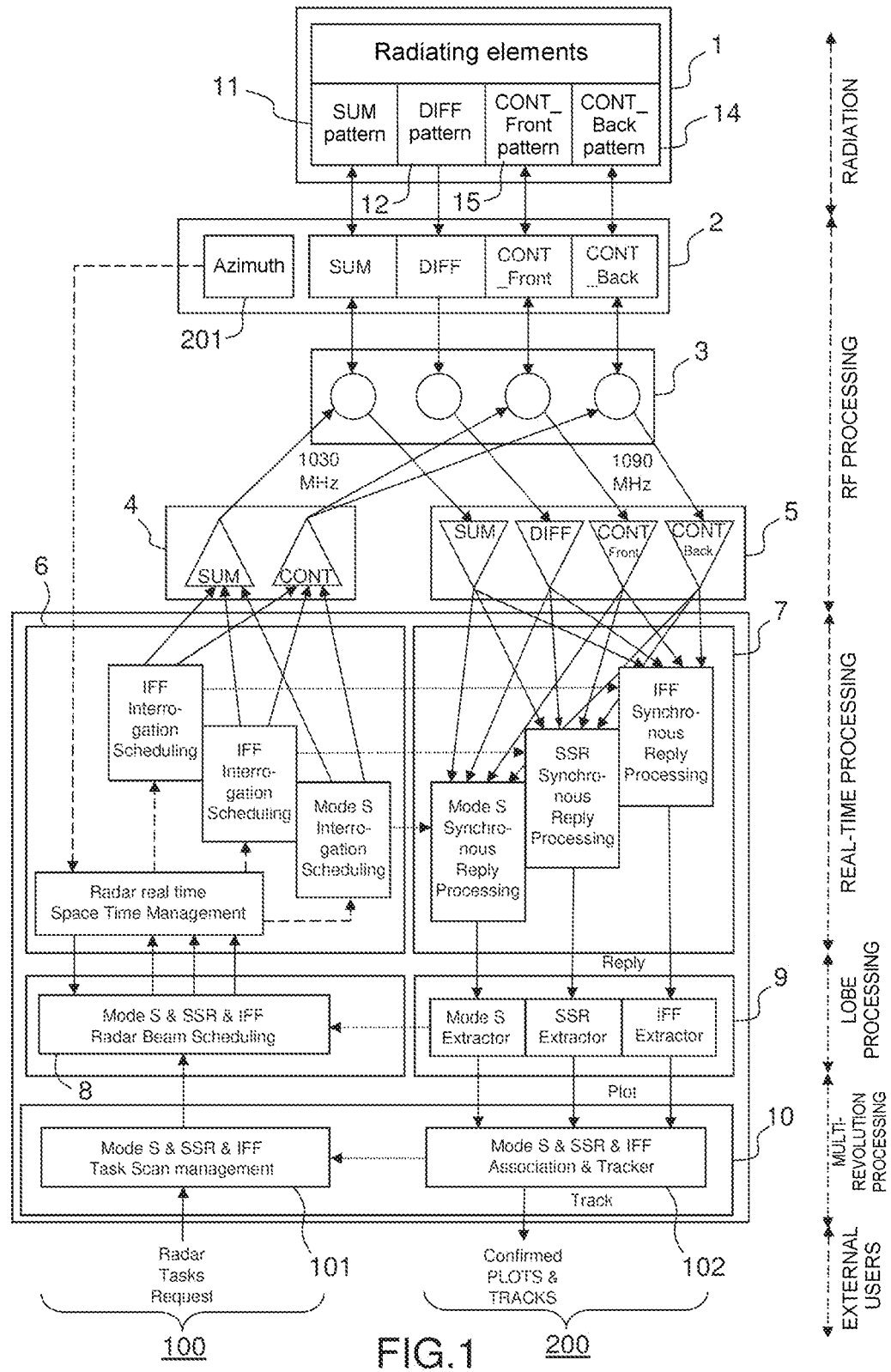
FIG. 1, an example block diagram of a Mode S secondary radar.

With respect to FIG. 1, which presents an example block diagram of a Mode S secondary radar, the principles of such a radar are reviewed. This principle (the Mode S exchanges between interrogator and aircraft being defined in detail by the ICAO in Annex 10 vol. 4) consists in:
- transmitting selective interrogations:
  - either indicating the recipient: a single target designated by its Mode S address (24-bit field);
  - or indicating the identifier of the transmitter (Code_IC identifier);
- receiving selective replies:
  - indicating the identifier of the transmitter: the same Mode S address of the target;
  - the main content of which depends on the message:
    - DF4: defining the altitude;
    - DF5: defining the identity (code A);
    - DF20: defining the altitude plus the BDS register, the number of which is known in particular through the interrogation which solicited it;
    - DF21: defining the identity (code A) plus the BDS register, the number of which is also known through the interrogation which solicited it.

Hereinafter in the description, the radar will be considered primarily under the aspect of the Mode S protocol whether or not it has the capacities to also process the SSR and IFF protocols that are not involved in the patent but nevertheless present in the most comprehensive configuration of a secondary surveillance radar.

In its standard use, the secondary radar operates in synchronous mode, that is to say that it transmits an interrogation and awaits a reply consistent therewith, which allows it to locate the target by measurement (in azimuth and distance) and identify (by Mode S address) the target.

To perform this task efficiently, the radar is equipped with an antenna 1 having several patterns 11, 12, 14, 15, the roles of which are conventionally:
- a sum pattern 11, hereinafter denoted SUM, for interrogating and detecting the synchronous reply from the target;
- a difference pattern 12, denoted DIFF, for finely locating the target in the SUM beam;
- a first control pattern 15, denoted CONT_front, for blocking and rejecting the replies from targets facing the antenna that are not present in the main SUM beam but interrogated by a secondary SUM lobe;
- a second control pattern 14, denoted CONT_back, for blocking and rejecting the replies from targets on the back of the antenna (therefore necessarily not present in the SUM beam but interrogated by SUM frontal lobe leaks).

Depending on the missions and therefore the efficiencies expected of the radar, the antennas can be:
- of several patterns:
  - 4 patterns: SUM, DIFF, CONT_Front & CONT_Back;
  - 3 patterns: SUM, DIFF, CONT (CONT_Front and CONT_Back are combined at the antenna level);
  - 2 patterns: SUM, DIFF/CONT (DIFF, CONT_Front & CONT_Back are combined at the antenna level);
- of different dimensions:
  - in width:
    - having a great width to have a fine main beam providing a strong gain and to be selective and accurate in azimuth;
  - in height:
    - having a great height, of large vertical aperture (LVA) type adding gain and protection against ground reflections (primarily in ATC);
    - having a small height, of "beam" type, adding mobility (primarily in IFF).

Whereas the SUM and DIFF patterns are conventionally fine with lobes at 3 dB between 2.4° and 10°, the CONT_Front and CONT_Back patterns seek to each respectively cover practically 180°.

The antennas can also be:
- of fixed pattern, called "mechanical" and revolving;
- of evolving pattern, with electronic scanning, called "AESA" and fixed or revolving.

In the following text of the patent, the most comprehensive antenna configuration is described, i.e. four rotary antenna patterns, bearing in mind that the other configurations are dealt with similarly regardless of the number of antenna patterns exploited, and whether the antenna is a revolving or fixed antenna. To simplify the description, it will however be possible to use the configuration with three patterns by using CONT in place of CONT_Front and CONT_Back.

The fundamental principle of the ADS-B squitter receiver using the same Mode S protocol (messages defined in detail by the ICAO Annex 10 vol. 4) consists in:
- receiving unsolicited, therefore asynchronous, selective replies:

indicating the identifier of the transmitter: the same Mode S address (24-bit field) of the target as that transmitted to the radar upon the selective interrogations and replies described hereinabove;

the nature of the content of the message (DF=17), the nature of which is variable according to the TC field of the message:

1 to 4 "Aircraft identification"
5 to 8 "Surface position"
9 to 18 "Airborne position (Baro Alt)"
19 "Airborne velocities"
20 to 22 "Airborne position (GNSS Height)"
23 "Test message"
24 "Surface system status"
25 to 27 "Reserved"
28 "Extended squitter AC status"
29 "Target state and status (V.2)"
30 "Reserved"
31 "Aircraft Operation status".

The above list is given by way of example, it is indicative and open-ended.

In its standard use, an ADS-B_in receiver therefore operates in asynchronous mode, that is to say that it listens over 360° for a Mode S message very similar to that of the radar for the location (azimuth and distance) and the identification (Mode S address) of a target.

To perform this task efficiently, the ADS-B_in receiver is equipped:

either with an omnidirectional antenna covering 360°, which is a common configuration;
or with several wide-pattern antennas covering 360° in total:
two antennas of coverage greater than 180° back-to-back, which is the most widely-used configuration;
more rarely, three antennas of coverage greater than 120° or indeed four antennas of coverage greater than 90°;

whose role is solely, through a unique pattern (of sum type), to detect the asynchronous reply from the target and decode its content, according to the formats reviewed hereinabove.

Given that the secondary radar and the ADS-B_in receiver exploit messages that are almost identical (same 1090 MHz frequency, same waveform, same data structure of the message of the reply) it is easy to incorporate in the radar the function for listening for asynchronous ADS-B squitters by listening for the latter through the different patterns of the antenna of the radar and doing so mainly, but not solely, through the omnidirectional pattern:

either by a reception function associated with an omnidirectional antenna pattern: CONT;
or by two receivers each associated with one of the two semi-omnidirectional antenna patterns: CONT_front & CONT_Back.

The listening for ADS-B squitters can be complemented by also exploiting, in detection, the SUM or even SUM and DIFF patterns in addition to CONT.

It should be noted that only the analysis of the ADS-B message is specific to ADS-B. All the rest is common, in particular the antenna lowering cables, the rotating joint if the radar is a revolving radar and the transposition of the 1090 MHz signals into baseband, to all the antenna patterns of the radar.

Before describing the invention in more detail, the constituent elements of the Mode S radar of FIG. 1 are described. The block diagram shows the synchronous operation of the Mode S radar:

on the left-hand part 100 through the generation of the interrogations;
on the right-hand part 200 through the synchronous processing of the associated replies, as well as the synchronizations between the latter through the transverse arrows between left and right.

The functions of the main elements are reviewed hereinbelow:

The antenna 1 ensures the radiation of the interrogations at 1030 MHz and of the replies in return at 1090 MHz, according to the four patterns: SUM, DIFF, CONT_Front and CONT_Back, or three patterns (SUM, DIFF, CONT), or according to two patterns (SUM, DIFF/CONT).

A rotating joint 2 and antenna lowering cables, for a rotary antenna, ensure:

the RF coupling of the signals transmitted at 1030 MHz and received at 1090 MHz independently for the four patterns between the revolving part and the fixed part of the radar;
the broadcasting of the azimuth position 201 of the axis of the main lobe of the antenna.

An RF processing comprises:

a duplexer or circulator 3 ensuring the RF coupling between the signals transmitted at 1030 MHz and received at 1090 MHz independently for the four patterns;
a transmitter 4 ensuring:
the transmission of the interrogations at 1030 MHz on the SUM pattern;
the blocking of the transponders outside of the SUM lobe at 1030 MHz by the CONT_Front and CONT_Back patterns;
this for the different secondary protocols: IFF, SSR and Mode S;
a receiver 5 ensuring the reception of the replies at 1090 MHz on the four patterns SUM, DIFF CONT_Front and CONT_Back, for the different secondary protocols: IFF, SSR and Mode S.

A real-time processing comprises:

a space-time management 6 ensuring the real-time management of the periods of associated interrogation and listening periods for the different secondary protocols: IFF, SSR and Mode S;
a signal processing 7 ensuring:
the processing of the replies in the listening periods associated with the interrogations for the different secondary protocols: IFF, SSR and Mode S;
the detection and the decoding of the synchronous replies in the main lobe of the antenna by exploiting the four patterns:
SUM: to detect the replies received in the main lobe;
DIFF: to finely locate in azimuth the replies received in the SUM main lobe and possibly for the detection;
CONT_Front and CONT_Back: to reject the replies received on the secondary SUM and DIFF lobes in the case of a detection in the main DIFF lobe.

A processing in the main lobe of the antenna comprises:

a management 8 of the targets present in the lobe, ensuring:
the preparation of the transactions (interrogations and replies) to be performed in the next lobe for the different secondary protocols IFF, SSR and Mode S;
the placement of the Mode S interrogations and replies in the future "Roll call" period as a function of the state of the transactions that have just been performed;

extractors 9 ensuring the construction of plots for each of the different secondary protocols IFF, SSR and Mode S, from the synchronous replies received in the lobe according to the protocol employed during the interrogations.

A multi-revolution processing 10 comprises:

a management 101 of the Mode S tasks to be performed with the targets within the coverage, ensuring the prediction of positions of the targets (antenna rendezvous) and the preparation of the tasks to be performed with these positions according to the internal and external requests and the status of the transactions of the preceding revolutions;

an association of the plots and a tracking 102 of the targets in the coverage ensuring the tracking of the targets to improve the performance levels (elimination of false plots and control of decoded data in particular) and to predict the future position thereof.

An interface with the users makes it possible for the radar to take account of different requests and to display the plots and the tracked targets.

Figure 2:
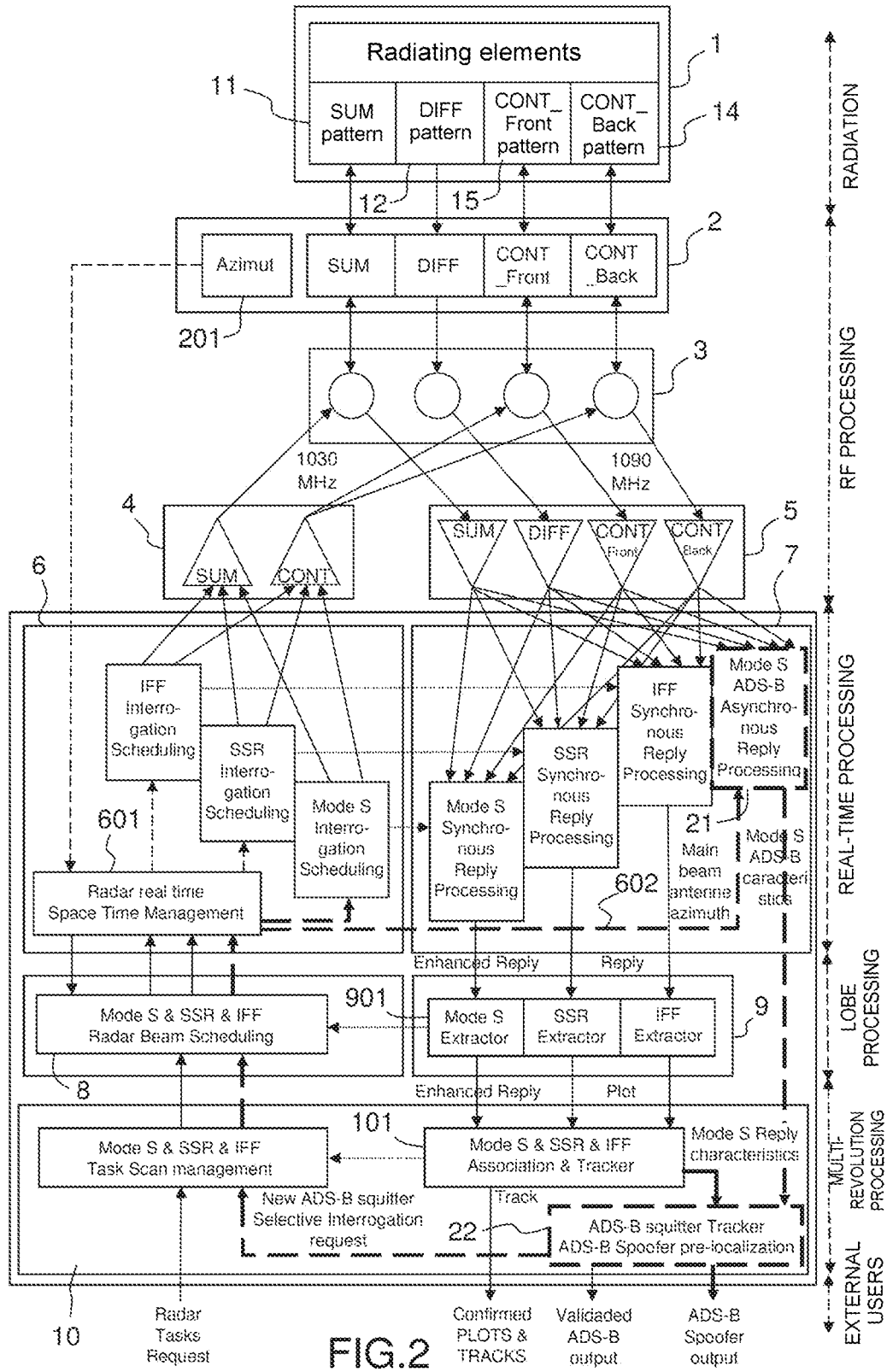
FIG. 2, an example of hardware implementation of the invention on the block diagram of the radar of FIG. 1.

FIG. 2 illustrates the hardware implementation of the invention by presenting the block diagram of the radar of FIG. 1 augmented by the elements specific to the invention. These elements are represented by broken lines.

Whereas the operation of the Mode S radar is synchronous, FIG. 2 shows that the processings added for the invention are not linked to the transmission and exploit only the azimuth position of the axis of the main lobe of the antenna.

Most of the elements remain unchanged, thereby bearing out the non-intrusive nature of the invention in the operational operation of the Mode S radar. In particular, selective interrogations to the ADS-B spoofer are added to try to locate it synchronously with the radar according to the conventional mode of operation of a Mode S radar as for any new target.

The roles of the main elements added are described hereinbelow.

In the real-time processing 6:
The space-time management 601
transmits 602 the azimuth position of the main lobe of the antenna to the processing 21 of the Mode S asynchronous replies (see below);

In the signal processing 7:
the permanent processing of the Mode S asynchronous replies is added (independently of the listening periods associated with the interrogations), ensuring the detection and the decoding of the asynchronous replies by separately but equally exploiting the four patterns SUM, DIFF, CONT_Front and CONT_Back:
to detect all the asynchronous replies received to decode these replies of type DF=17 and extract from them the message data and the Mode S address;
to enrich each decoded reply with its following characteristics: time of detection, azimuth of the main lobe of the antenna upon the detection, misalignment of the reply in the main lobe (single-pulse voltage) and powers received on SUM, DIFF, CONT_Front and CONT_Back, in the case of a detection of the squitter on SUM, the reply can be processed as a synchronous reply by assigning it an off-boresight angle measurement voltage which finely locates it in azimuth in the lobe;
the synchronous replies are enriched with the power measured on SUM, DIFF and CONT_Front, the time of detection and the antenna azimuth.

In the processing in the main lobe:
in the extractor 901 of the Mode S:
the Mode S plots are enriched with their synchronous replies with, for each, the power measured on SUM, DIFF, CONT_Front and the antenna azimuth.

In the multi-revolution processing 10:
the association 101 of the plots and tracking of the targets in the coverage:
transmits the tracks with Mode S address with the replies enriched with the power measured on SUM, DIFF, CONT_Front and the antenna azimuth;

the processing 22 of the ADS-B squitters is added, comprising:
an ADS-B remote processing which:
ensures the tracking of the ADS-B squitters to filter the false detections and false decodings;
validates the ADS-B tracks by comparing with the synchronous tracks of the radar before broadcasting them;
for the ADS-B tracks uncorrelated with synchronous tracks of the radar, because they are maybe new (not yet detected in "All Call" by the radar), requires a selective interrogation by the radar at its predicted position during the passage of the SUM pattern (if necessary over several revolutions, in the event of failure).

An ADS-B spoofer processing:
for the ADS-B tracks that cannot be detected by selective interrogations by the radar, the ADS-B track is not validated and potentially considered as an ADS-B spoofer;
for the calculation of the azimuth position of the spoofer by correlation of the received power information on SUM, DIFF, CONT_Front and CONT_Back of each detection of the ADS-B squitters of the spoofer with the patterns measured (in the factory or on site).

The method according to the invention comprises at least two steps:
a first step of detection of an ADS-B spoofer at the radar level;
a second step of pre-localization in azimuth of the position of the ADS-B spoofer at the radar level.

This second step can be followed by a third step:
this third step performing a refined location in azimuth and in distance of the ADS-B spoofer in a multi-radar configuration, typically at the control centre level.

The aim of the detection followed by the location of a generator of false ADS_B squitters (spoofers) is to not take account of this information broadcast in the squitters both at the radar level and at the control centre level, and its particular aim is also to make the activity of this generator cease as soon as possible by allowing units to intervene on the place of location. Given that all the ADS_B squitter-receiving equipment will not necessarily be able to implement the invention, quick action is essential.

It should be noted that regular users of ADS_B are the ACAS anti-collision systems on board aeroplanes, these anti-collision systems also seeking to use the spoofers.

The means for detecting an ADS-B spoofer using another active sensor (radar or sensor of WAM type), used in the first step, are known to a person skilled in the art. The detection information could also be supplied by means external to the radar.

Nevertheless, in the radar-integrated ADS-B_in reception version, the aim of the detection means is to:

validate the ADS-B squitters before external broadcasting of the data of the ADS-B squitters in standard CAT021 output to the normal users;

to eliminate, or mark as doubtful, the squitters considered as "atypical" from the standard CAT021 output to the normal users, these squitters being able to be characterized in particular by:

a non-detection of ADS-B target by the radar at a position broadcast by these ADS-B squitters;

an inconsistency in position between the radar detection and the broadcast ADS-B position;

a power inconsistency according to the declared distance from the radar by taking account of the gains of the radar antenna patterns having detected the squitter;

an inconsistency in content of the data transmitted between the data extracted by the radar and those broadcast by the ADS-B squitter;

a received squitter rate different from the ADS-B standard (as applied by the other targets);

to declare the presence of an ADS-B spoofer in a new output dedicated to this purpose to a supervision centre, a priori a multi-radar centre.

It should be noted that the ADS-B replies are structurally identical to the synchronous Mode S replies intended for the radar, the data differing however between the DF04, DF05, DF20 and DF21 on the one hand and DF17 on the other hand. There is therefore a similarity of processing between the radar receiver and the ADS-B receiver, ensuring the reliability due to the common processing:

in waveform: 1090 MHz carrier frequency and in modulation of the signal (PPM);

in message structure: same Mode S message structure (preamble, data and CRC).

Like a radar target in Mode S, the ADS-B squitter is identified by its Mode S address (deliberately common to the Mode S and, WAM radars and ADS-B_in receiver).

Furthermore, the ADS-B squitter reception function being incorporated in the radar, it advantageously makes it possible:

to ensure that an ADS-B reply received, most probably, on the CONT pattern (or CONT_front, CONT_back, depending on the type of antenna) must be interrogatable in synchronous mode by the SUM pattern of the same antenna at the azimuth and distance position where the ADS-B squitter is declared to be, since the difference in gain between SUM and CONT is conventionally close to 20 dB on average in favour of SUM;

to ensure this selective interrogation with great responsiveness, avoiding any uncertainty as to the changing position of the target having transmitted the squitter;

to complement, if necessary, this first analysis with an analysis of:

the received power of the squitter as a function of its declared distance to the radar relative to the other surrounding targets, in fact for the other targets received in radar and ADS-B it is possible to evaluate, depending on its distance and at very close instants (typically less than 4 to 6 seconds depending on the rotation of the radar) the average power deviation:

in synchronous reception by the radar with the SUM pattern;

in asynchronous reception by the ADS-B receiver, probably with the CONT pattern;

the flight behaviour thereof.

The second step, performing the pre-location in azimuth of the ADS-B spoofer, is specific to the invention. It therefore applies mainly to the ADS-B squitters that the first detection step has detected as spoofers or marked as doubtful. For ease of description, the term ADS-B spoofer location may be used, it being understood that it in fact concerns locating the ADS-B spoofer generator.

Theoretically, the pre-location in azimuth of an ADS-B spoofer by a secondary radar incorporating the ADS-B reception could be performed from the detection of an ADS-B squitter in the main lobe of the radar. In this case, the monopulse function, associated with the detection of the squitter, makes it possible to measure the azimuth of the squitter generator with an accuracy identical to that of the radar with a single squitter. However, that is possible only if:

the reception of the ADS-B squitters is processed like the synchronous replies from the radar with a detection on all the patterns, by having associated with each (synchronous or asynchronous) reply both power per pattern and the monopulse value assigned to the asynchronous reply that the squitter is;

the detection of the squitters is performed well within the main lobe (in bearing where the monopulse function is operational) which is of the order of +/−1.2° (conventional 3 dB lobe), i.e. therefore with a temporal probability of 2.4/360 equal to 0.66%, therefore very low.

The probability with this location mode is therefore very low although real.

Advantageously, in this second step, the invention uses a more efficient location mode, in the temporal probability sense in particular. This mode, detailed hereinbelow, consists in exploiting the fact that the ADS-B squitters encounter (or sample) the antenna patterns at different bearings, the bearing being the misalignment relative to the main axis of the antenna. The knowledge of the antenna alongside the measurement of the powers by patterns makes it possible to work out assumptions of bearing and therefore of azimuth for each received squitter. The accumulation of these assumptions makes it possible to reveal the most probable azimuth.

This location mode is now detailed. Given that the ADS-B squitters are asynchronous by nature and are received at any moment by the radar, they sample the antenna patterns at different bearings. More specifically, they are picked up by the antenna patterns at different bearings.

Indeed, each ADS-B squitter is also qualified in amplitude according to the different patterns (SUM, DIFF & CONT) of the antenna as well as the time and the azimuth of the antenna.

It is known that, for a typical secondary ATC antenna or even a conventional antenna in IFF, the patterns change greatly in bearing. The result of this is clearly that the relative SUM vs CONT and DIFF vs CONT powers are qualifiers of the bearing at which an ADS-B squitter is received. The taking into account of the antenna azimuth at the moment of reception of the squitter therefore makes it possible to associate with each squitter one or more assumptions of possible positions in azimuth of the ADS-B generator that is the source of the squitters.

FIGS. 3a to 3j illustrate, by way of example, the method as described above. In this example, the radar comprises an IFF antenna typically having three patterns: SUM, DIFF and CONT. The rotation period of the antenna is 4.8 seconds. An ADS-B spoofer situated at the 100° azimuth periodically transmits squitters at a fairly low rate (period equal to 0.5 seconds).

In this context, FIGS. 3a to 3j illustrate different locations of the squitters of the spoofer on the SUM, DIFF and CONT patterns throughout a revolution of order N, the patterns revolving with the antenna. The SUM, DIFF and CONT patterns are respectively referenced 31, 32, 33 in the figures.

Figure 3A:
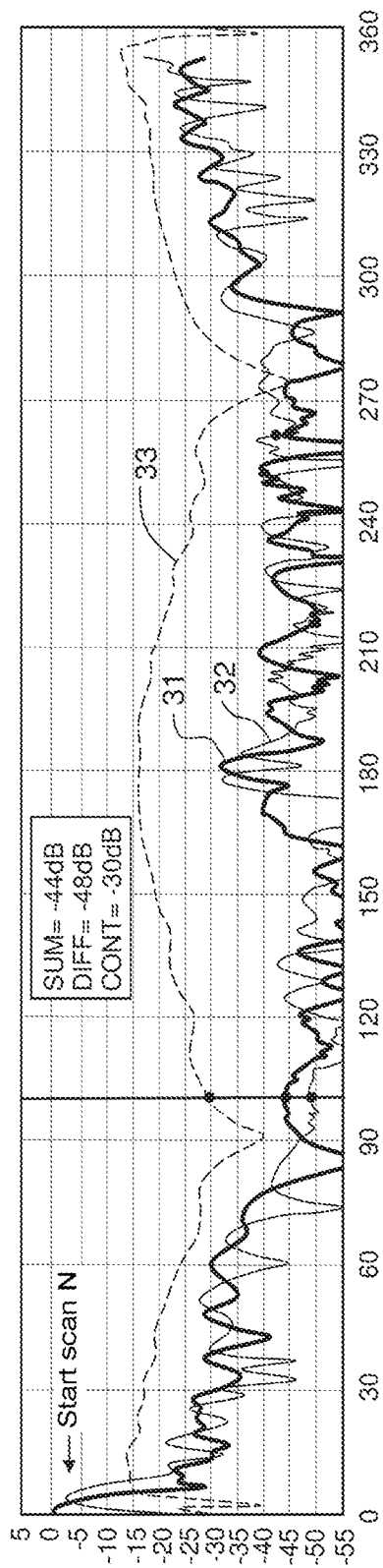
FIGS. 3a to 3j, an illustration of an embodiment of a step of the method according to the invention.

In this representation, the start of an antenna revolution corresponds to the position of the antenna where the SUM pattern is centred at the 0° azimuth. This configuration is illustrated by the diagram of FIG. 3a. The diagrams of the following FIGS. 3b to 3e successively represent an antenna position (SUM pattern centred at this azimuth), offset in azimuth by 37.5° (mean deviation in azimuth between two ADS-B squitters) then the positions offset by 75°, 112.5° and 150°, the spoofer always remaining at the azimuth of 100°.

Likewise, the diagrams of FIGS. 3f to 3j successively represent the second part of the antenna revolution successively from top to bottom, the antenna positions at 187.5°, 225°, 262.5°, 300° and 337.5°.

On each detection of an ADS-B squitter, the method according to the invention associates the position in azimuth of the antenna and the level received on each of the antenna patterns as the table below shows by way of example:

| Antenna azimuth Degrees | Squitter bearing Value to be determined Degrees | SUM dB | DIFF dB | CONT dB |
|---|---|---|---|---|
| 0 | +100 | −44 | −48 | −30 |
| 37.5 | +62.5 | −32 | −37 | −26 |
| 75.0 | +25 | −28 | −26 | −17 |
| 112.5 | −12.5 | −26 | −23 | −13 |
| 150.0 | −50 | −33 | −32 | −21 |
| 187.5 | −87.5 | −44 | −39 | −45 |
| 225.0 | −125 | −41 | −47 | −26 |
| 262.5 | −162.5 | −45 | −47 | −17 |
| 300.0 | −200 | −55 | −36 | −51 |
| 375.0 | −237.5 | −50 | −46 | −26 |

Depending on the accuracy of pre-location in azimuth required of the ADS-B spoofer, these values are accumulated for each ADS-B squitter at the end of the revolution N with those acquired in the preceding revolutions for the same target.

It can be considered that the accuracy of the azimuth pre-location is linked:
- to the number of squitters received (preferably within a short time in the case where the target is moving in space);
- to the power of the squitters, therefore a priori to the distance between the radar and the spoofer;
- to the rate of squitters that the spoofer generates (more pattern sampling points);
- to the use in the next step of the patterns of the antenna on its site of use to take into consideration the potential deformations of the patterns due to reflections or multiple paths.

At the radar level, the second step for the pre-location in azimuth of a ADS-B squitter generator therefore consists in estimating its position in azimuth by exploiting their power characteristics and the knowledge of the patterns common to the radar and ADS-B_in sensors. As indicated previously, the measurements can be accumulated over several revolutions depending on the desired location accuracy.

From each triplet of measurement of the powers received on CONT, SUM, and DIFF (in dBm), it is easy to work out the relative power pairs of SUM versus CONT (SUM/CONT) and DIFF versus CONT (DIFF/CONT), in dB.

The antenna patterns are searched for the bearings that give a pair of values within N dB of that obtained for each squitter. The position in azimuth of the antenna is then associated with the moment of the squitter to create one, or several, assumptions of the azimuth of the spoofer:

$$Az(Sp)=Az(A)+G(S\_ADS\text{-}B) \qquad (1)$$

in which:
- $Az(Sp)$ is an assumption of the azimuth of the spoofer;
- $Az(A)$ is the azimuth of the antenna;
- $G(S\_ADS\text{-}B)$ is the estimation of the bearing of the ADS-B squitter.

The azimuth of the spoofer generator is a function of these assumptions. Several probability functions that are also known can be used to determine this azimuth.

The knowledge of the SUM, DIFF and CONT antenna patterns is necessary to form all these estimations of bearing. To this end, these patterns are for example measured in the factory where the antennas are manufactured, or on the site where the radars are arranged in operation. The measurement of these patterns can be performed with a power deviation tolerance that can be adjusted according to several factors, and with an accuracy of definition of the patterns of the antenna according to multiple approaches.

The value of the tolerance is linked to several factors such as, in particular:
- the accuracy of the power measurement: the greater it is, the lower N can be, N being the tolerance value to retain an assumption of bearing;
- the speed of convergence expected to find the pre-location in azimuth, that is to say the number of assumptions accumulated before being able to transmit an azimuth pre-location of the spoofer;
- the accurate knowledge of the patterns of the antenna on the site, that is to say, in fact, the accessible accuracy of the antenna patterns (accuracy of the reading of the antenna patterns).

This process of location in azimuth, performed in the third step, can of course be executed simultaneously by the different secondary radars of the system when M is greater than 1, where M is the number of secondary radars used in the radar system implementing the method according to the invention.

For each ADS-B squitter generator having the same Mode S address, the successive assumptions of azimuth are accumulated according to two approaches:
- either suitable for targets moving in azimuth over a short time which can be, for example, the duration of one or several antenna revolutions (the moving targets being, for example, spoofer generators embedded on drones at short range), in this case it is preferable to do several independent and inaccurate pre-locations and then to track the target to evaluate its motion and predict its next position in azimuth;
- or suitable for a stable target over a longer time (many antenna revolutions, 10 revolutions for example) to have better accuracy.

To roughly locate a spoofer in motion an azimuth accuracy with average pitch intervals can be chosen, of 0.5° to 1° for example. To finely locate a fixed spoofer, a very fine pitch interval can be chosen: 0.1° for example.

This process can of course be executed simultaneously on both approaches in order to adapt to any type of spoofer movement.

Figure 4:
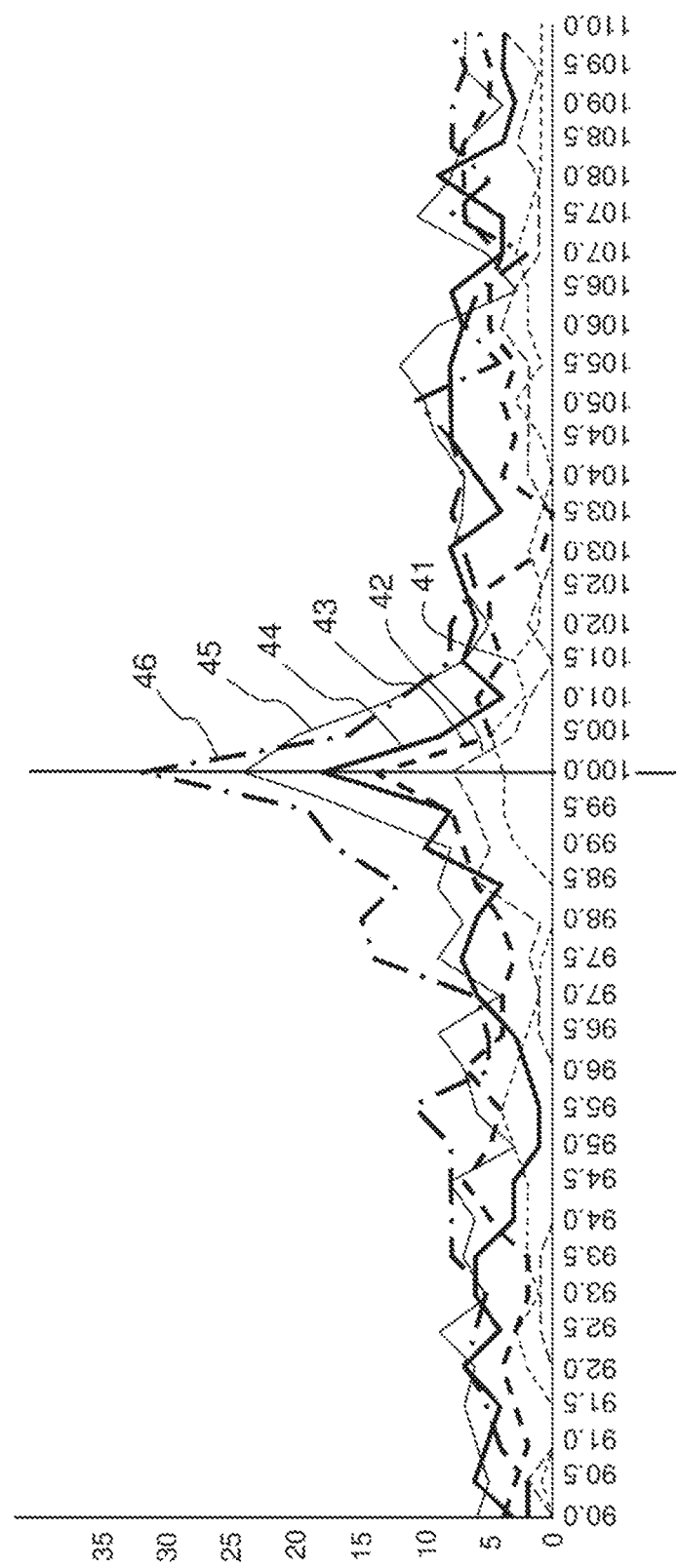
FIG. 4, an illustration of the accuracy of detection and of azimuth location of a spoofer.

FIG. 4 illustrates the accuracy of location of a fixed spoofer, obtained by the processing of the radar signal in this second step, as a function of the number of squitters detected, that is to say as a function of the number of assumptions of azimuth of these splitters accumulated over one or several antenna revolutions.

To summarize, upon the reception of an ADS-B squitter, the latter is enriched with the relative power measurements between the SUM, DIFF and CONT antenna patterns. By correlating these with those of the antenna patterns, several assumptions of misalignment of the spoofer relative to the main axis of the antenna (this misalignment being the bearing) at the moment of reception of the squitter are obtained. The azimuth of the antenna is then used to calculate the different assumptions of azimuth of the spoofer (see relationship (1) above).

By accumulating, for each squitter of this same spoofer (having the same Mode S address), the different assumptions of azimuth, it is possible to determine the most probable azimuth. Thus, the greater the number of squitters received from the spoofer, the more accurate the location of the azimuth thereof, as FIG. 4 shows.

Figure 3B:
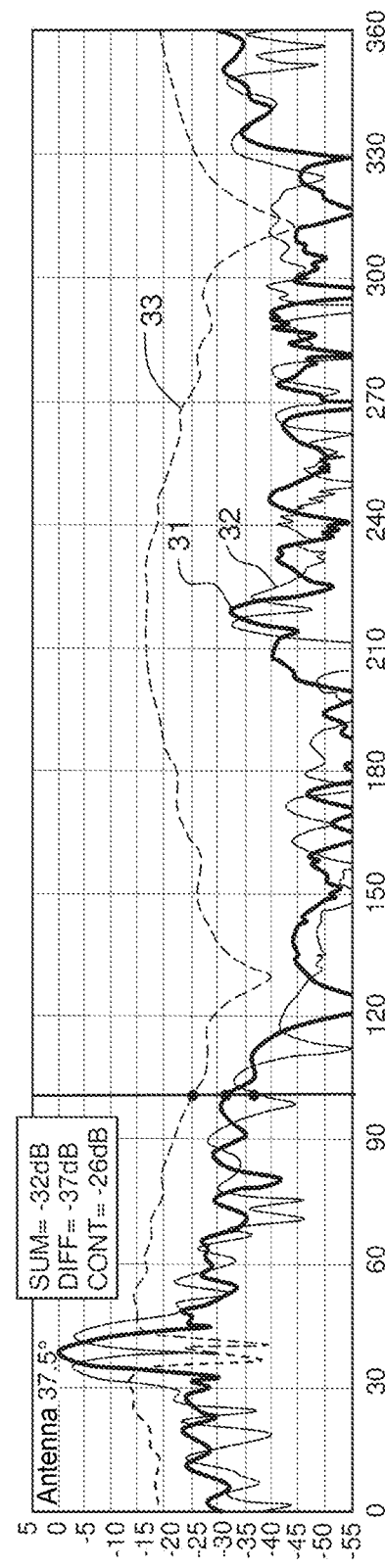
Figure 3C:
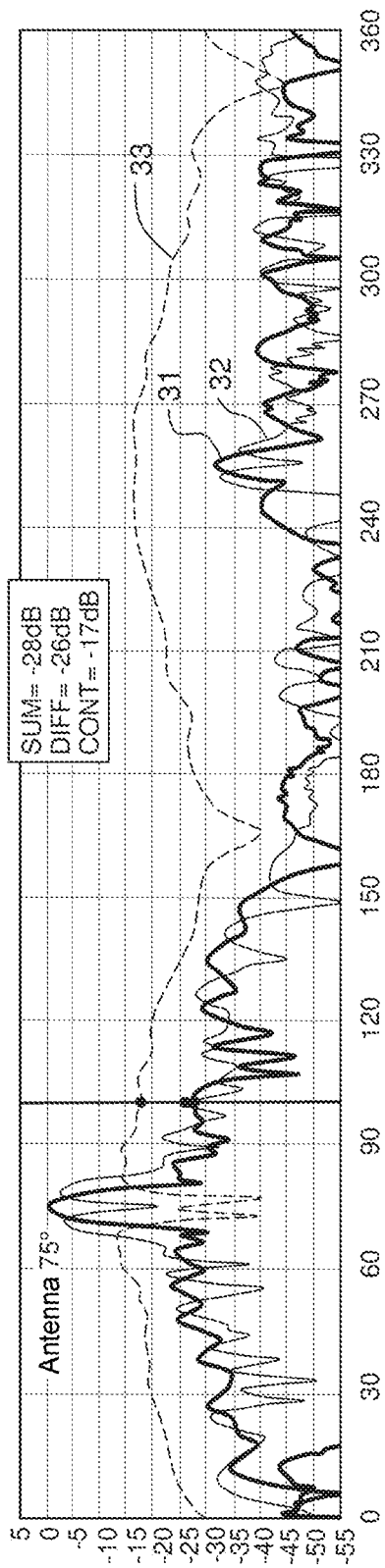
Figure 3D:
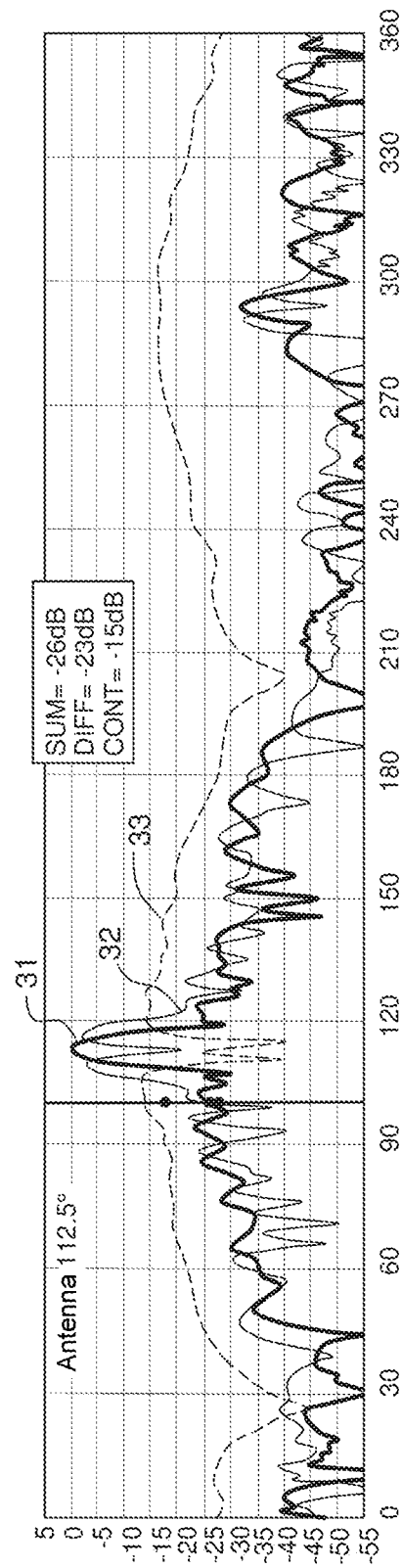
Figure 3E:
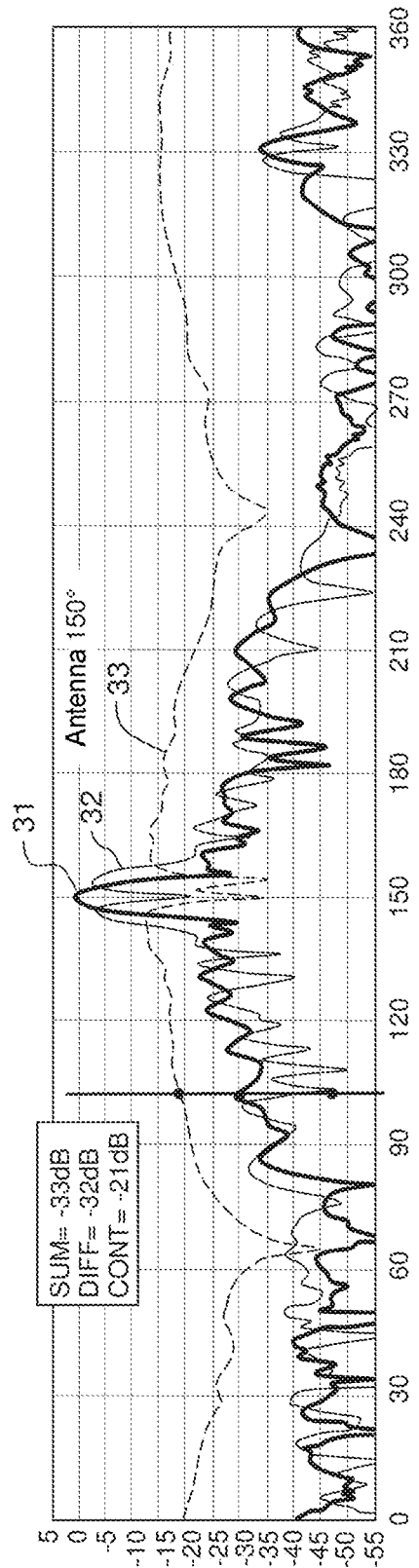
Figure 3F:
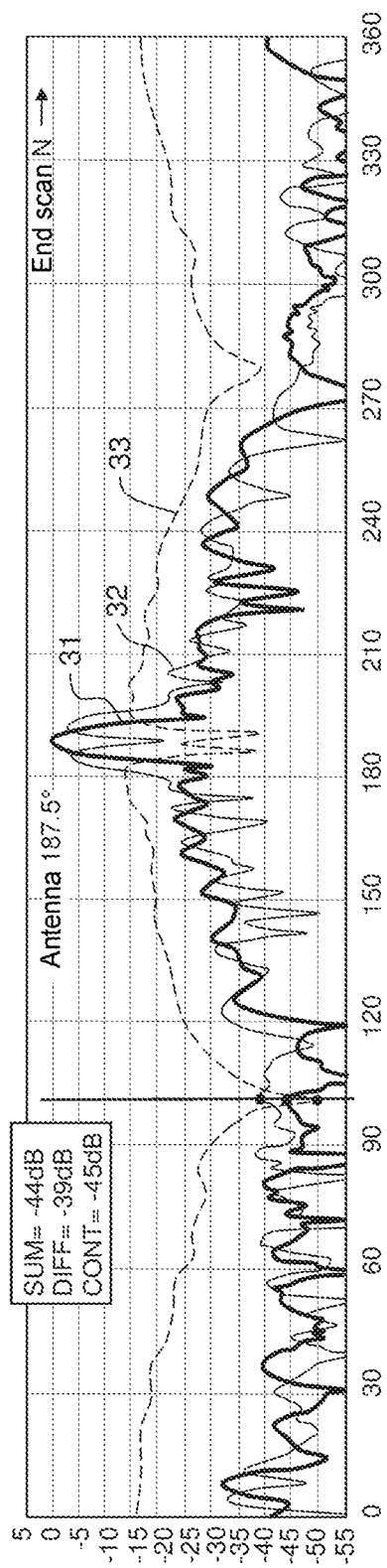
Figure 3G:
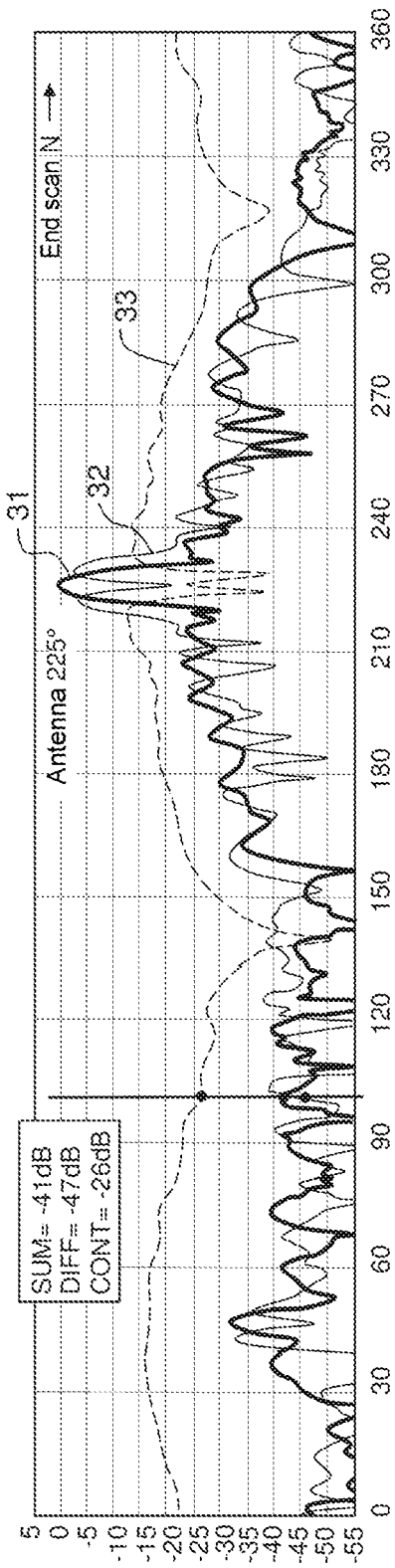
Figure 3H:
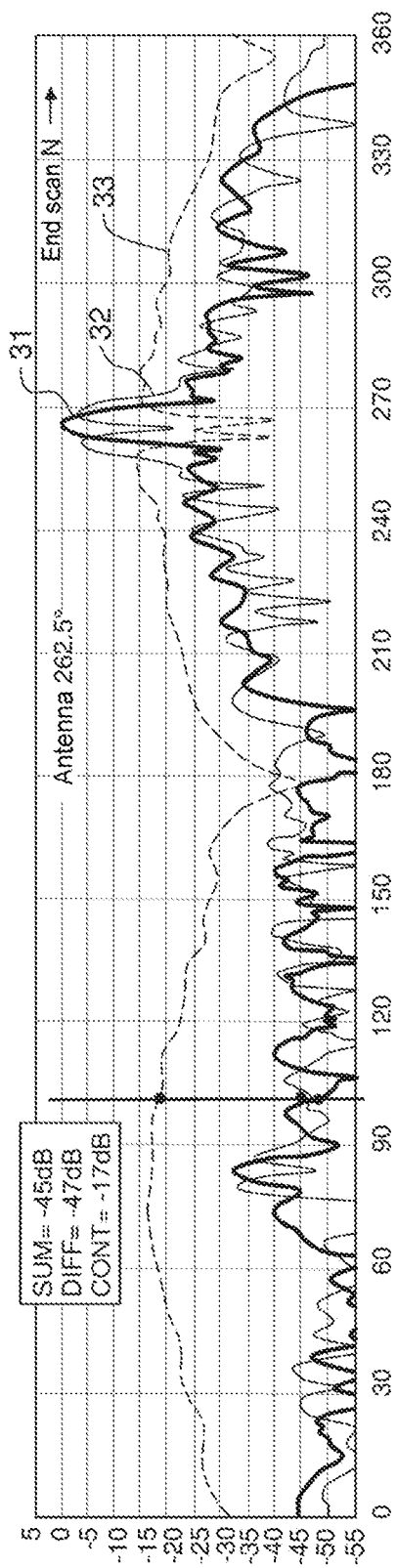
Figure 3I:
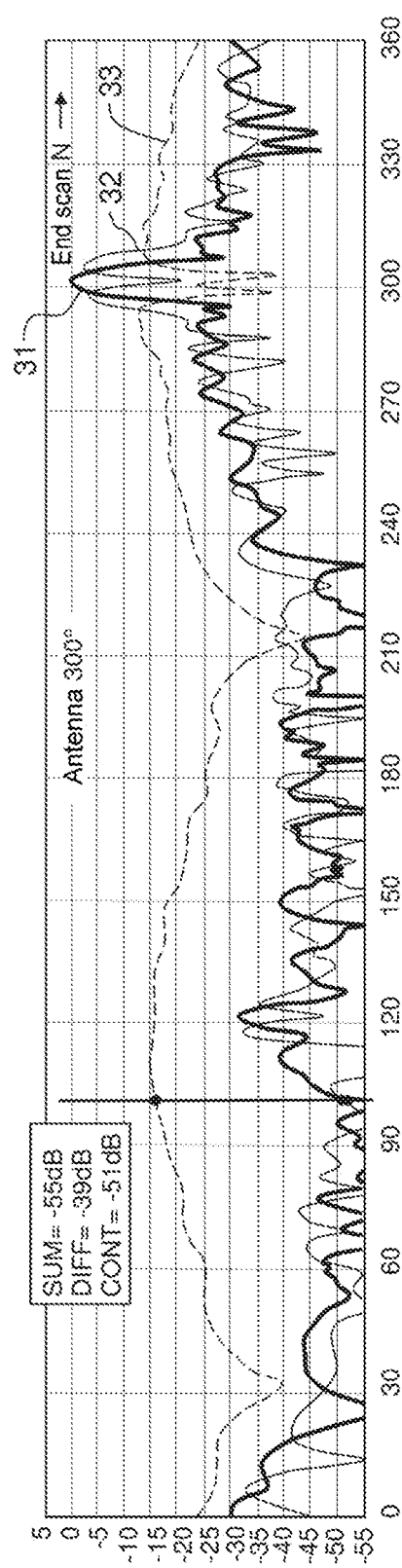
Figure 3J:
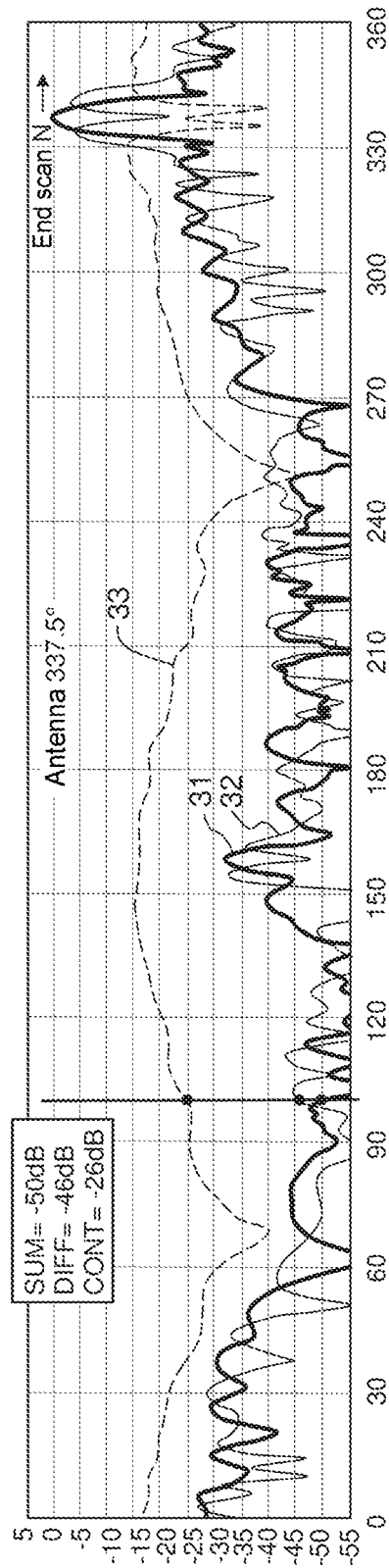

The spoofer considered in this FIG. 4 is that of FIGS. 3a and 3b, positioned at the 100 azimuth °. FIG. 4 shows the correlation peaks of the assumptions of azimuth obtained for different numbers of squitters, as a function of the azimuth. It shows six plots of correlation 41, 42, 43, 44, 45, 46 corresponding respectively to 10, 20, 30, 40, 50 and 60 squitters. In this example, it can be seen that a usable accuracy of location is obtained from 30 squitters (plot 43) and a refinement of the location is obtained as a function of the increase in squitters (plots 44 to 46).

Figure 5A:
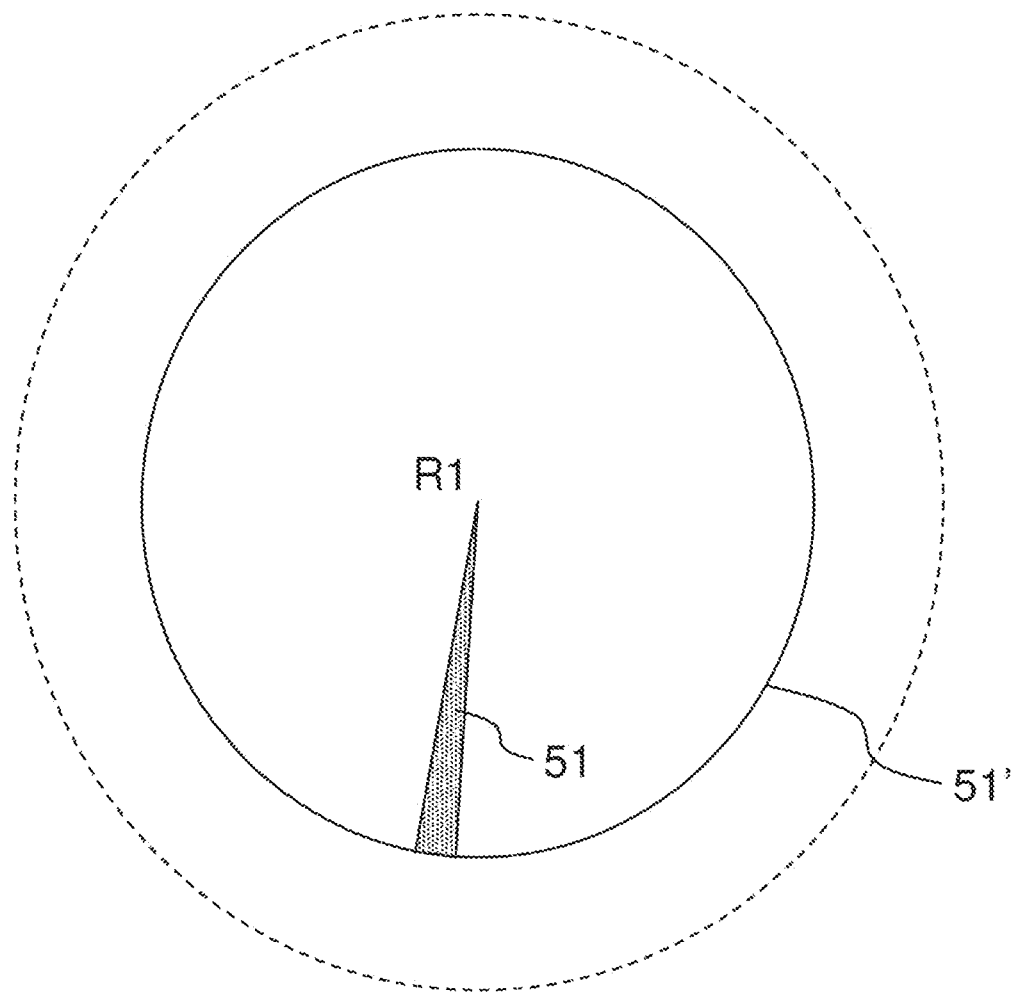
FIGS. 5a to 5c, an illustration of the implementation of a third possible step of the method according to the invention.
Figure 5B:
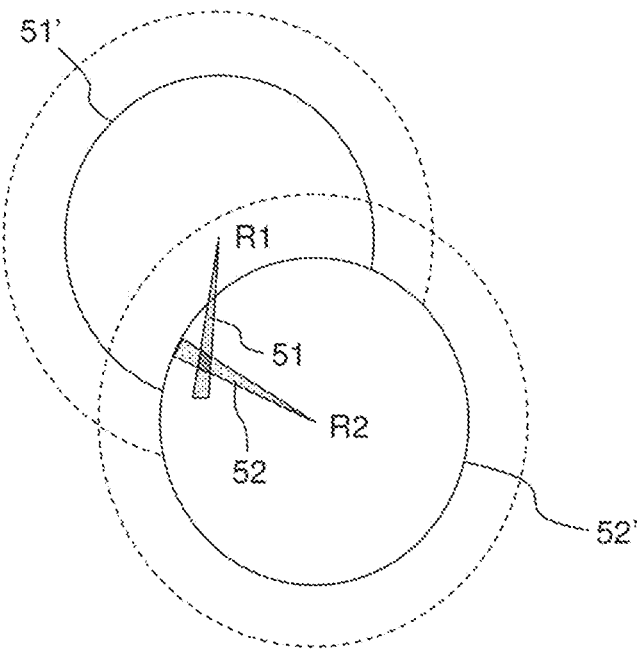
Figure 5C:
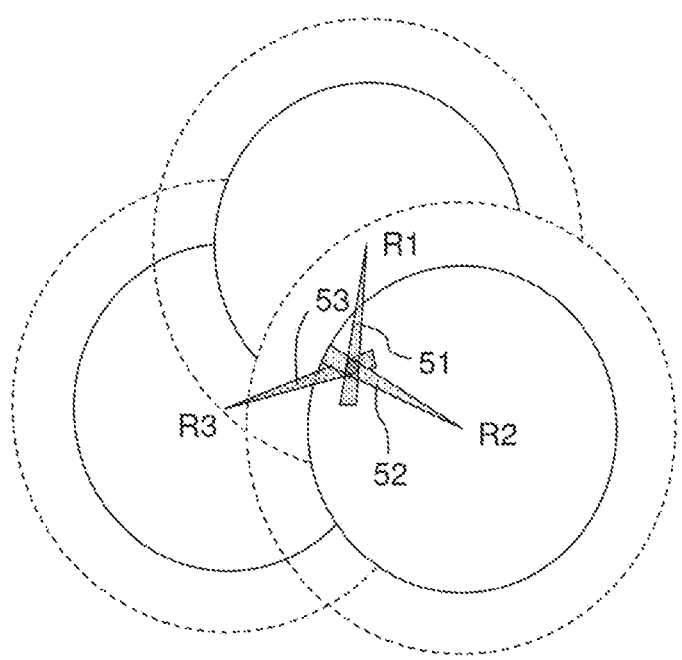

FIGS. 5a to 5c illustrate the third step of the method according to the invention.

The principle of this third step consists in crossing the pre-locations of several radars (obtained in the second step), to:
refine the position in azimuth of the ADS-B spoofer (with respect to the radars), if the position in azimuth obtained in the second step is considered as insufficient;
calculate the distance from the ADS-B spoofer (with respect to the radars);
by realizing the intersection of the pre-locations of the radars, these pre-locations being weighted by:
the quality of the pre-location (correlation peak level);
the uncertainty on this pre-location at the level of each of the radars (relative levels of the correlation peaks obtained for the radars);
the distance from the spoofer to the different radars.

FIG. 5a illustrates the location in azimuth of the spoofer for a first radar positioned at a point R1. The azimuth obtained by this first radar is represented by an angular segment 51 within the area of coverage 51' of the radar.

FIG. 5b adds a second radar and the representation in azimuth of the spoofer with respect to this second radar. This second radar is positioned at a point R2. The azimuth of the spoofer is represented by an angular segment 52 within the area of coverage 52' of the radar. The refined azimuth of the spoofer is the intersection of the two azimuths, that is to say of the two angular segments 51, 52. This intersection also supplies the distance from the spoofer with respect to the radars, the target being positioned within this intersection.

FIG. 5c adds a third radar. This third radar is positioned at a point R3. The azimuth of the spoofer is represented by an angular segment 53 within the area of coverage 53' of the radar. The refined azimuth of the spoofer is the intersection of the three azimuths, that is to say of the three angular segments 51, 52, 53. This intersection also improves the accuracy of measurement of distance from the spoofer relative to the radars.

Conventionally, the refined azimuth and distance measurements are calculated from the azimuth measurements (angular segments 51, 52, 53) supplied by the radars to a computation centre, which can be housed in the processing means of one of the radars R1, R2, R3 or in an independent computer. The azimuth data are transmitted by the communication means known from elsewhere.

It is also possible to pre-locate the target in elevation at the radar level (to ultimately locate it in altitude by a multi-radar system in a second stage in accordance with FIGS. 5a to 5c, which is suitable in the case of a drone equipped with a spoofer).

For that, the assumptions of azimuth are performed in parallel by exploiting several cuts in elevation of the azimuth patterns according to the same method as described above and do so independently for each cut.

At the end of the period of integration of the squitters, by retaining the highest correlation peak out of the different cuts in elevation, an azimuth and elevation pre-location is simultaneously defined.

It should be noted that the principle implemented still consists in assuming that, for the duration of the time of integration of the squitters before a decision is taken as to the pre-location in azimuth and in elevation of the target, the latter has not moved either in azimuth or in elevation. This therefore remains valid for fixed targets or targets that do not move around too much, typically at most a few radar antenna revolutions. The drone must not be too close to the radar in order for its azimuth speed seen by the sensor to remain average.

The invention can also advantageously be used to detect and locate certain cases of failing ADS-B transmitter. In particular, the invention can be used to increase safety in air traffic control (ATC), in particular to eliminate or confirm doubts concerning squitters exhibiting position deviations. In particular, the azimuth pre-location information produced in the second step can be transmitted to an ATC centre over a link dedicated to ADS-B alerts in case of inconsistency to increase safety.

The invention has been described for a rotary antenna. It is also possible to provide a non-rotary antenna whose beam is displaced in azimuth by successive random aimings.

The invention claimed is:

1. A method for the detection and location of generators of ADS-B spoofers by a radar system comprising at least one secondary radar, an ADS-B spoofer being a false ADS-B squitter, an ADS-B squitter being an aircraft position information signal transmitted to receivers including the receivers of the radars of said system, said ADS-B squitters being detected over time at different bearings of the antenna, said method comprises, for each secondary radar, at least the following steps:
a first step of detecting an ADS-B spoofer;
a second step of locating an azimuth position of said ADS-B spoofer generator, said second step comprising the following operations:
measuring the azimuth of the antenna of the secondary radar and measuring the received powers on the sum, difference, and control patterns of the antenna upon the detection of an ADS-B squitter;
generating and storing at least one assumption of azimuth of said spoofer for each ADS-B squitter detected, said assumption being equal to the sum of the azimuth of said antenna and of an assumption of estimated bearing of said spoofer, said estimated bearing being characterized by the convergence between the pair of the ratios of the received power on the sum pattern to the received power on the control pattern on the one hand and by the ratio of the received power on the difference pattern to the received power on the control pattern on the other hand, and the same pairs for the different possible known bearings of the antenna.

2. The method according to claim 1, wherein said second step also produces an accumulation of said assumptions over a given time period, the azimuth of said ADS-B spoofer being a function of said assumptions.

3. The method according to claim 2, wherein the generation of said azimuth assumptions uses at least two deviation tolerances from a group consisting of:
   the accuracy of measurement of said power;
   the number of assumptions accumulated; and
   the accuracy of the reading of the antenna patterns.

4. The method according to claim 2, wherein in said second step, said assumptions are accumulated:
   over a given time, to locate a fixed ADS-B spoofer generator; or
   over a shorter time, to locate an ADS-B spoofer generator in motion.

5. The method according to claim 1, wherein said radar system comprising at least two secondary radars, said method further comprises a third step of locating said ADS-B spoofer generator in terms of distance, said third step crossing the azimuth angular segments of each secondary radar, the distance from said ADS-B spoofer generator to a radar being the distance from said intersection to said radar, an azimuth angular segment being an angular segment centred on the azimuth obtained in said second step.

6. The method according to claim 5, wherein the angular deviation of said intersection gives the accuracy of location in terms of azimuth of said ADS-B spoofer generator.

7. The method according to claim 5, wherein in said second step, said assumptions of said ADS-B spoofer at the level of a radar are worked out both in azimuth and in elevation by exploiting in parallel several assumptions based on azimuth antenna patterns according to different cuts in elevation.

8. The method according to claim 7, wherein in said third step, said system comprises at least three secondary radars, said ADS-B spoofer is located in terms of azimuth, distance, and altitude by the intersection of solid angular segments of each secondary radar, a solid angular segment being a segment of solid angle centred on the azimuth and on the elevation obtained in said second step.

9. The method according to claim 5, wherein in said third step the location of said ADS-B spoofer is performed as a function of:
   the quality of the location defined in said second step;
   the uncertainty on said location defined by each of said radars; or
   the distance of said ADS-B spoofer with respect to each of said receivers.

10. The method according to claim 1, wherein said assumptions of said ADS-B spoofer azimuth use, in parallel, several accuracies in terms of azimuth of said antenna patterns, the azimuth being defined according to pitch intervals, the azimuth pitch interval to locate a spoofer generator in motion being greater than for locating a fixed generator.

11. The method according to claim 1, wherein said first step is implemented externally to said radar system.

12. A secondary radar, comprising: means for implementing said first step of the method according to claim 1; and means for implementing said second step of the method according to claim 1.

13. A system of at least two secondary radars, comprising:
   processing means capable of communicating with said secondary radars; and
   the at least two secondary radars, each comprising:
      means for implementing said first step and said second step of the method according to claim 5; and
      means for implementing said third step of the method according to claim 5.

14. The system according to claim 13, wherein said processing means are incorporated in one of said radars.

* * * * *